350-396 SR

XR 3,348,217

CROSS REFERENCE

Oct. 1[illegible], [illegible] A. A. SNAPER 3,348,217

ELECTRO-OPTICAL COMPUTER OR DATA PROCESSING SYSTEM USING SUPERIMPOSED POLARIZERS

Filed May 1, 1964 3 Sheets-Sheet 1

INVENTOR
ALVIN A. SNAPER
BY Allen E. Botney
ATTORNEY

ELECTRO-OPTICAL COMPUTER OR DATA PROCESSING SYSTEM
USING SUPERIMPOSED POLARIZERS

Filed May 1, 1964

INVENTOR
ALVIN A. SNAPER
BY Allen E. Botney
ATTORNEY

INVENTOR
ALVIN A. SNAPER
BY Allen E. Botney
ATTORNEY 3,348,217
ELECTRO-OPTICAL COMPUTER OR DATA PROCESSING SYSTEM USING SUPERIMPOSED POLARIZERS

Alvin A. Snaper, P.O. Box 83, Burbank, Calif. 91503

Filed May 1, 1964, Ser. No. 364,083
7 Claims. (Cl. 340—173)

ABSTRACT OF THE DISCLOSURE

By means of this invention, a film is provided whose opposite surfaces are polarized differently from one another at different points thereon. As a result, and through the use of light that is either unpolarized or polarized in the manner the film surfaces are polarized, the film can readily be used for optical computer or data processing purposes.

The present invention relates to the computer and data processing field in general and more particularly relates to apparatus for optical computer or data processing system.

It will be recognized that although great strides forward have been made in the computer and data processing fields, there is nevertheless considerable room for improvement. Thus, one area in which improvements could be made is in the information storage or memory unit of such a system. At the present time, for example, each element in the memory customarily stores only one of two possible bits of information, namely, the presence or absence of data commonly indicated as a "0" or a "1." It is obvious that this imposes a limit of the volume of data that can be stored at any one time in any one memory unit. Accordingly, there is an everpresent need to find some means for storing larger amounts of data that would be easily accessible and, if at all possible, without increasing the expense or complexity of the apparatus involved. Again, another area in which improvements could be made is in the area of data input. Punched cards are very frequently used for this purpose and they further limit system capacity or capability due to the fact that the openings therein need to be spaced apart and, therefore, limited in number in order to avoid unduly weakening the physical structure of these cards. Moreover, the use of punched cards limits the type of data input at any one point to either "0" or "1," which likewise restricts system capability.

Still other disadvantages or limitations are encountered in the prior art which it would be desirable to eliminate, such as, for example, the fact that prior systems are, for a number of reasons, confined to serial read-out of information.

The present invention overcomes the above-mentioned and still other shortcomings found in the prior art and, in accordance with the basic concept thereof, it does so by utilizing optical polarization which, in its most refined and optimized form, permits real time computations, access, memory, and storage which may be read out in a variety of ways in either serial or parallel form. Stated differently, the present invention provides a uniquely flexible arrangement of electro-optical apparatus that may be used as input, storage and output in computer or data processing systems and, in various combinations, the apparatus can be used as an adjunct or replacement for presently utilized computer and data processing systems.

More particularly, the present invention provides an optical system in which binary computations are achieved by means of polarization techniques. More specifically, in a system of the present invention, information is stored or recorded in the form of small polarized or unpolarized areas, the polarized areas being divided into those that are polarized in one direction or another. The pattern or format of the polarized or non-polarized areas is programmed and may be said to constitute the system memory. Similarly, the data fed into the system is also in the form of polarized and non-polarized areas, the polarized areas hereto being selectively polarized in either one of the two directions. It is thus seen that by placing the memory and data input elements in registration with each other, that is to say, by superimposing them, and thereafter applying appropriately polarized and non-polarized light to them, very much larger quantities of information can be dealt with or employed. Furthermore, because the data is in the form of tiny polarized and non-polarized areas, the data can be packed very much closer together than heretofore possible, thereby very greatly increasing the density of the information on the system elements. All of this, naturally, increases the capacity and versatility of such systems.

In addition, one of the singular advantages that need to be mentioned is the fact that the information can easily be read out in parallel and, therefore, in less time than permitted in earlier systems. All that is required is that the beams of light be simultaneously applied to all the data areas and when this is done, the output is obtained instantaneously. It will be obvious that the output will take the form of light polarized in one direction or another or of light that is unpolarized. Since light can be prevented from passing through, the output may also be said to include the absence of light.

It is, therefore, an object of the present invention to apply the technique of light polarization to the operation of computer and data processing systems.

It is a further object of the present invention to provide optical apparatus for computer and data processing systems which makes it possible for such systems to handle larger quantities of data than heretofore possible.

It is another object of the present invention to provide optical apparatus for computer and data processing systems which greatly enhances the capability and flexibility of such systems.

It is an additional object of the present invention to provide the use of light-polarization techniques in computer and data processing systems.

The novel features which are believed to be characteristic of the invention, both as to its organization and method of operation, together with further objects and advantages thereof, will be better understood from the following description considered in connection with the accompanying drawings in which embodiments of the invention are illustrated by way of example. It is to be expressly understood, however, that the drawings are for the purpose of illustration and description only and are not intended as a definition of the limits of the invention.

FIGURE 1(*b*) is a graphical plot of the relative value output for the FIG. 1(*a*) representation;

FIGURE 2(*b*) is a graphical plot of the binary pulse value for the FIG. 2(*a*) representation;

Figure 3:
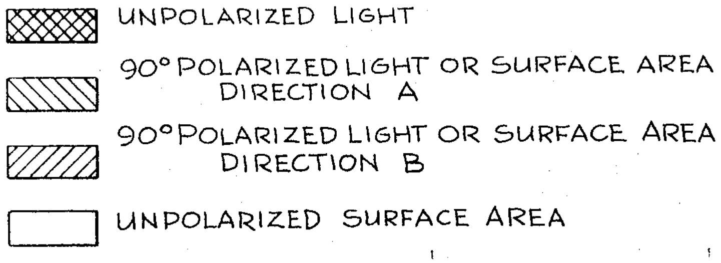
FIGURE 3 is a view of the top and bottom surfaces of an element and illustrates the manner in which those surfaces may be polarized in accordance with the present invention.
Figure 3:
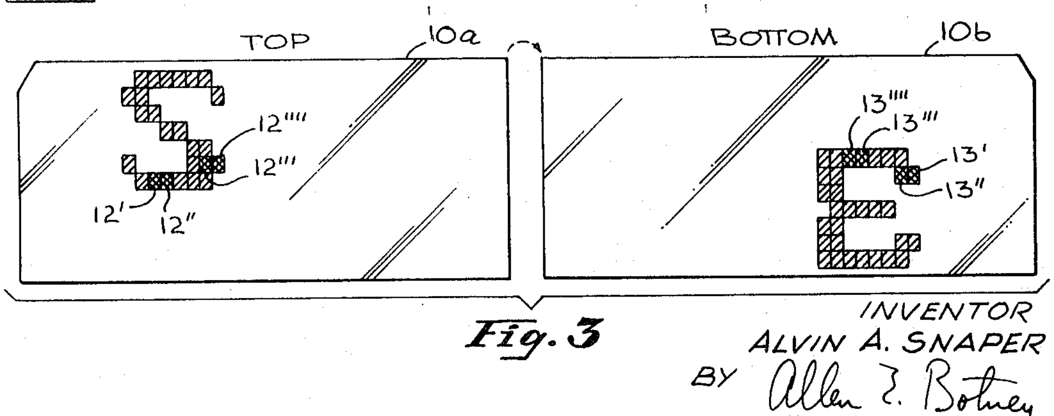
Figure 5:
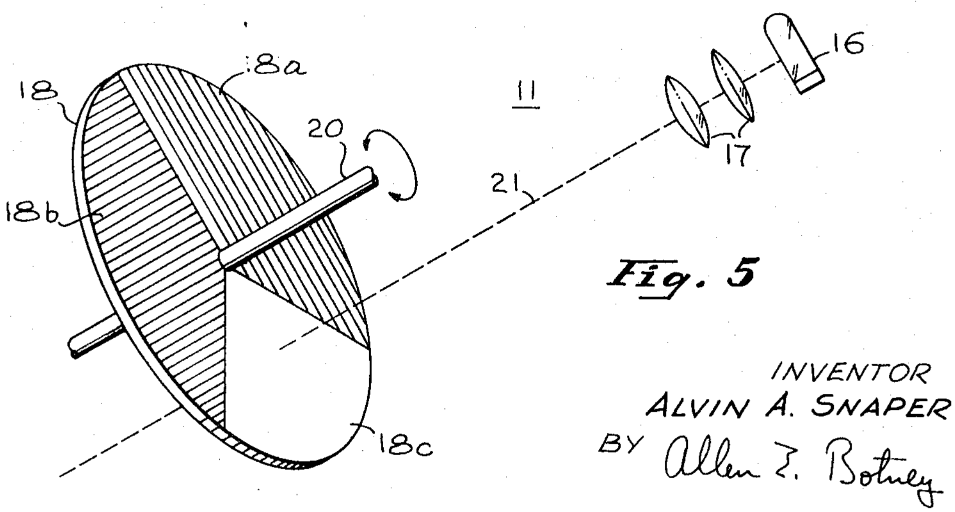
Figure 6A:
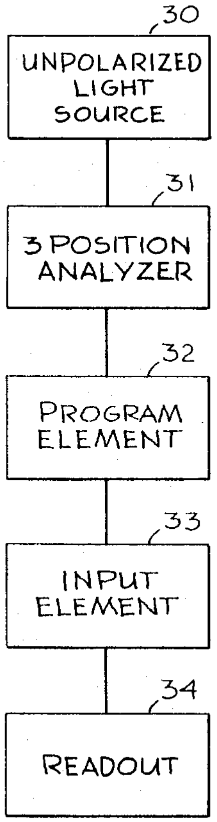
Figure 6B:
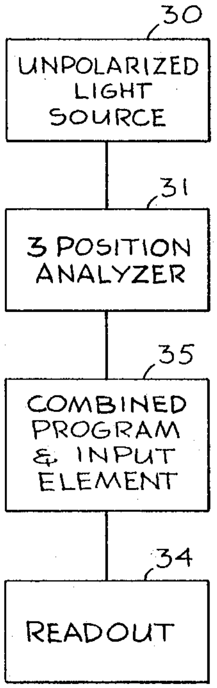
Figure 6C:
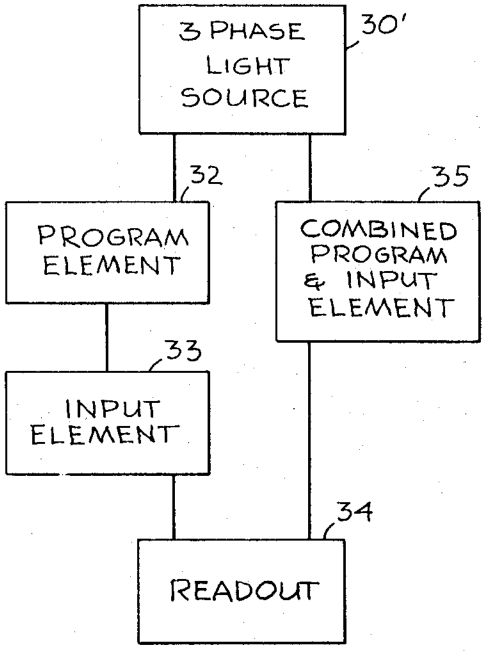
Figure 7:
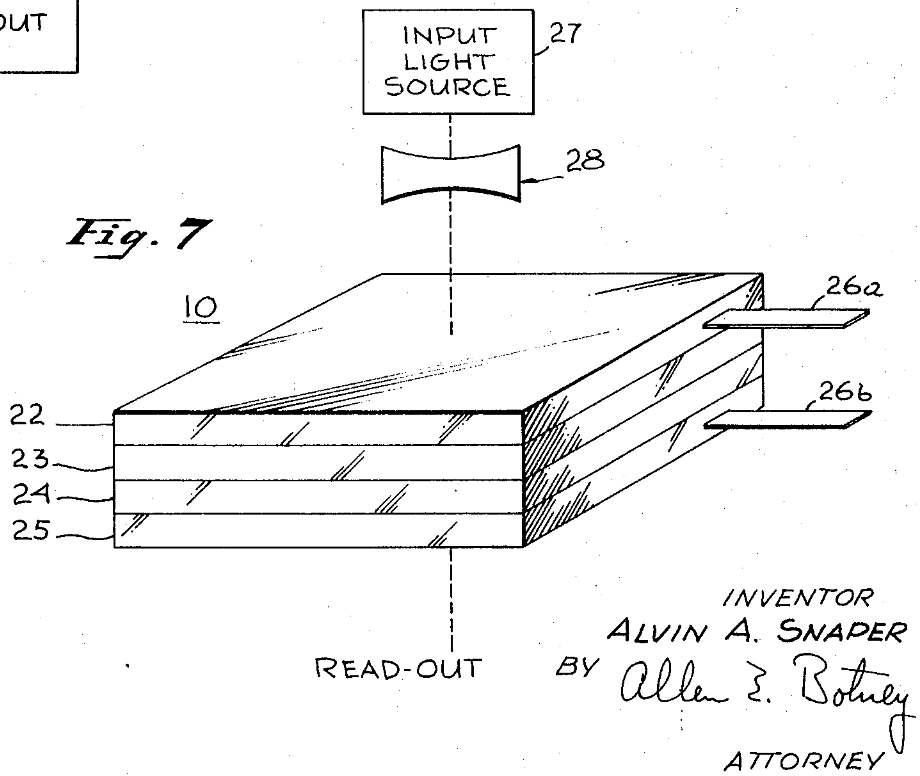

FIGURE 4(*a*)–4(*g*) illustrate one method by which the FIG. 3 element and the programmed surfaces thereof may be fabricated;

FIGURE 5 shows one possible arrangement of a three-phase light source that may be used in a system according to the present invention;

FIGURES 6(*a*)–6(*c*) are block diagrams respectively illustrating possible configurations; and FIGURE 7 illustrates another kind of element that may be used with or in substitution of the FIG. 3 element.

Figure 1A:
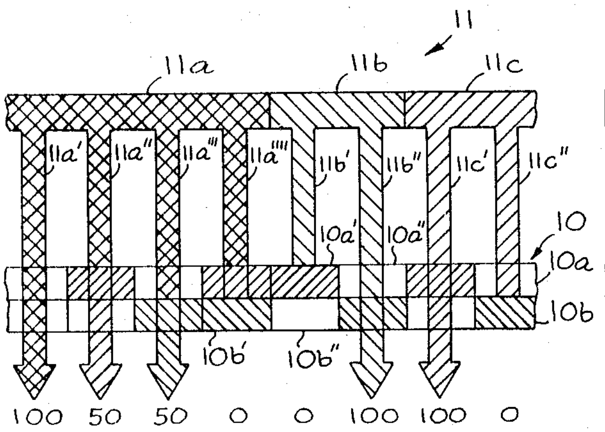
FIGURE 1(*a*) is a schematic representation of relative light output modulated by a programmed optically-polarized element.
Figure 2A:
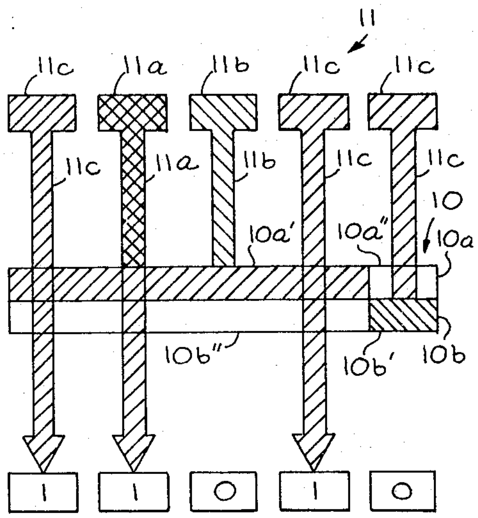
FIGURE 2(*a*) is schematic representation that illustrates the concept of the present invention for simple binary computations.
Figure 1B:
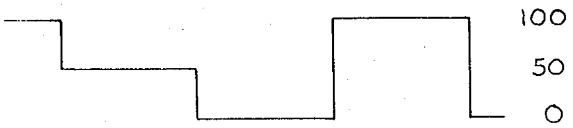
Figure 2B:
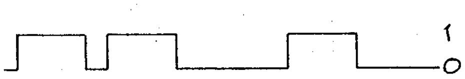

Considering now the invention in detail reference is made to the drawings and to FIGS. 1 and 2 in particular wherein the basic principles of the present invention are schematically illustrated. Thus, in FIG. 1(*a*), there is shown a layer of material, generally designated 10, whose top and bottom surface areas 10*a* and 10*b*, respectively, are differently polarized as is indicated by the differently hatched and unhatched areas. The significance or meaning of the hatching is indicated on the drawing below FIG. 1(*b*) wherein a cross-hatched area is shown to represent unpolarized light, a blank or completely unhatched area is shown to represent an area either on the top or bottom surface of material 10 that is unpolarized, an area hatched in one direction is shown to represent either light or an area on material 10 that is polarized in one direction, such as direction A, and an area that is hatched in an orthogonal direction is shown to represent either light or an area on material 10 that is likewise polarized in an orthogonal direction, such as direction B. Thus, by way of example, hatched areas 10*a′* and 10*b′* respectively represent small areas on the top and botom surfaces of material 10 that are differently polarized, namely, they are polarized in directions that are orthogonal to one another. On the other hand, blank areas 10*a″* and 10*b″* represent unpolarized surface areas on material 10.

Above (or below) layer 10 is a three-phase equal output value light source, generally designated 11, by means of which either unpolarized light or light polarized in one or the other of the directions mentioned may be selectively directed against the top and bottom surface areas of the material. As is shown in the figure, the light emanating on the extreme left of source 11, namely, light 11*a*, is completely unpolarized light, whereas light emanating from the center and extreme right portions of source 11 are respectively polarized in directions A and B, as may be clearly seen from the hatching employed.

As may also clearly be seen from FIG. 1(*a*), the light out of source 11 is incident upon layer 10 and the amount of light passing through it at any point thereon is dependent upon the nature of the incident light as well as the polarized condition or state of the top and bottom surface areas of the layer whereat the light is incident.

More specifically, considering unpolarized light 11*a* first, the four unpolarized light beams shown in the figure are designated 11*a′*, 11*a″*, 11*a‴* and 11*a⁗*. With respect to light beam 11*a′*, it will be seen from the figure that it strikes a portion of material 10 whereat neither the top nor bottom surface areas are polarized, that is to say, it strikes the material at a place whereat unpolarized areas 10*a″* and 10*b″* are in registration. Consequently, as is indicated by the arrow at the end of beam 11*a′*, all the light passes through the material except that which is absorbed, or reflected by it, which is not under consideration here. The fact that the entire beam passes through the material is indicated by the numeral 100, representing 100%, directly beneath the beam arrow. With respect to unpolarized beams 11*a″* and 11*a‴*, these two beams also pass through material 10 but, ignoring absorption and reflection losses, only 50% of the light in these beams gets through as is indicated by the numerals 50 beneath the arrows at the end of each of these beams. The reason for this is that beams 11*a″* and 11*a‴* respectively encounter and pass through polarized areas 10*a′* and 10*b* on the top and bottom surfaces of material 10, which accounts for half the light getting through. On the other hand, none of the light in beam 11*a⁗* passes through the material because it encounters both polarized areas 10*a′* and 10*b′* which are in registration here. The fact that no light from light beam 11*a⁗* passes through material 10 is indicated by the numeral 0.

Considering now polarized light 11*b* emanating from light source 11, this the light polarized in direction A and two light beams having such polarization, respectively designated 11*b′* and 11*b″*, are shown in the figure. With respect to light beam 11*b′*, this beam is incident upon polarized surface area 10*a′* which, it will be remembered, is cross-polarized with respect to the polarization of the light. Accordingly, none of the light in this beam passes through material 10 as is indicated by the numeral 0. However, 100% of the light in beam 11*b″* passes through material 10 to the other side for the reason that the beam first encounters an unpolarized surface area 10*a″* and, after passing through it, thereafter encounters a polarized surface area 10*b″* which is polarized in the same direction as the light. As before, the extent of the light transmission is indicated by the numeral 100 positioned below the arrow at the end of the column representing light beam 11*b″*.

Finally, attention is directed to polarized light 11*c* out-of light source 11 and, here again, as in the preceding case, two light beams respectively designated 11*c′* and 11*c″* are presented for purposes of discussion. Thus, light beam 11*c′*, which is polarized in direction B, strikes a surface area of material 10 that is similarly polarized, namely, an area 10*a′*, with the result that the light passes through this area and through the unpolarized surface area 10*b″* in registration therewith to the other side of the layer. This complete transmittal of light beam 11*c″* is likewise indicated by the numeral 100 beneath the arrow. As for polarized light beam 11*c″*, it is first incident upon and passes through an unpolarized surface area 10*a″* but after it passes through this unpolarized top surface area, it impinges upon a bottom surface area that is cross-polarized with respect to the light, that is to say, this bottom surface area 10*b′* is polarized in direction A. Consequently, in this last situation, none of the light in beam 11*c″* gets through, as is indicated by the numeral 0 therebeneath.

The several different outputs obtained from the FIG. 1(*a*) arrangement are graphically illustrated by the waveform shown in FIG. 1(*b*) wherein the different levels respectively represent the ratio of the output light intensity to the incident light intensity at different points on material 10. Furthermore, it will be noticed that the FIG. 1(*b*) waveform is positioned to be in registration with material 10 so that the different levels of the waveform may be easily corresponded or reconciled with the different polarized areas on the material and the various output percentages previously indicated in FIG. 1(*a*) by the numerals 0, 50 and 100.

Those skilled in the art will recognize from the FIG. 1 diagrams that with a three-phase equal output value light source, eight levels of informational output is made available by single surface scanning of the programmed material. As illustrated, it is evident that four information channels are available with the unpolarized light source although only three value levels are resolved. However, the use of a polarizing analyzer for the read-out makes the fourth level available. The use of two additional plane polarized light sources makes four additional informational levels available for read-out, thereby making a total of eight discrete channels. It will be noted that where there is a positional juxtaposition of polarized data on the top and bottom surfaces of the material, an automatic binary computation results which can be read out by visual means in normal room illumination without the necessity of any auxiliary equipment. Thus, the material itself becomes a simple binary computer which can be utilized independently as well as in a more sophisticated system.

To illustrate this facet of the invention, reference is now made to FIG. 2(*a*) wherein a layer of material 10 is shown once again, but this time its polarized surface areas are arranged differently from those in FIG. 1. Thus, in FIG. 2(*a*), the top surface 10*a* of material 10 has one area thereon, namely, area 10*a'*, that is polarized in direction B and another area alongside the first, namely, area 10*a''*, that is unpolarized. Bottom surface 10*b*, on the other hand, is just the reverse, by which is meant that surface 10*b* has one unpolarized area 10*b''* that is directly beneath and in registration with polarized area 10*a'* and another area 10*b'* that is polarized in direction A, this latter area being also directly beneath and in registration with unpolarized area 10*a''*. Thus, in FIG. 2(*a*), the overlying surface areas of material 10 are either polarized in one direction or the other but they are never cross-polarized with respect to each other or completely unpolarized. The computer aspects of this arrangement can be seen with the aid of light beams 11*a*–11*c* where, as before, 11*a* designates a beam of unpolarized light, 11*b* designates a beam of light polarized in direction A, and 11*c* designates a beam of light polarized in direction B.

Proceeding in alphabetical order, unpolarized light beam 11*a* strikes polarized area 10*a'* and then passes through it to the other side of material 10 although the beam becomes polarized in the process of doing so. The story is different, however, with respect to light beam 11*b* which is cross-polarized with respect to polarized surface area 10*a'*. Consequently, none of the light in beam 11*b* passes through material 10. Finally, with respect to the three beams designated 11*c*, two of these beams are incident upon polarized areas 10*a'* and since the light on these two beams is polarized in the same direction as area 10*a'*, the two beams are able to pass through material 10 to the other side. However, the third of the three light beams designated 11*c* is incident upon unpolarized area 10*a''*, with the result that it passes through this top surface area to encounter the cross-polarized bottom surface area 10*b'*. It will be recognized that because the light and the bottom surface area are differently polarized, none of the light gets through here. Since light is either present or absent on the output side of layer 10, it will be apparent to those skilled in the art that a particular output may be represented by "0" or "1," the "1" state customarily representing or corresponding to the presence of an output and the "0" state likewise representing or corresponding to the absence of an output. By way of example, under the particular set of conditions of FIG. 2(*a*), the output of the arrangement therein may be represented by the binary number 11010, as is clearly indicated in the figure by the insertion of these digits in the space beneath material 10. The waveform corresponding to such a binary output is shown in FIG. 2(*b*) wherein the waveform rises to the "1" level where the light beams have emerged from the output side of the material and remains at the "0" level where the light was not able to pass through.

It would be appropriate to mention at this point that the format or arrangement of the polarized and unpolarized areas on the surfaces of material 10 in FIGS. 1 and 2 are illustrative only. Accordingly, it should be recognized that different numbers as well as arrangements of polarized and unpolarized areas may be utilized as determined, in any one case, by the particular programming desired.

The layer of material 10 may be given any one of a number of different geometric configurations, such as the rectangular or card-like configuration shown in FIG. 3 wherein, for illustrative purposes, the bottom surface 10*b* has been swung outward like the pages of a book so that the top and bottom surfaces of the layer lie in a common plane. Referring to the layer's top surface, surface 10*a*, the small hatched boxes thereon represent small areas that are polarized in one direction, such as direction B, the arrangement and location of these polarized areas being determined by the programming desired. The unhatched areas lying between or outside the hatched areas represent unpolarized portions of the surface. However, it should be mentioned that only a small portion of the entire top surface area 10*a* has been used for this example and that, in fact, the entire top surface is covered in this manner with polarized and unpolarized areas which would show up as hatched and unhatched boxes or areas in the figure. Similarly, the hatched boxes on bottom surface 10*b* represent small areas that are polarized in the other direction, that is, in direction A, the blank or unhatched areas between them representing the unpolarized portions of the bottom surface. Here too, only a small fraction of the entire bottom surface has been utilized by way of example. Thus, in reality, the entire bottom surface is covered with polarized and unpolarized areas arranged according to the predetermined program.

In considering top and bottom surfaces 10*a* and 10*b* together, it will be recognized that wherever polarized and unpolarized areas are superimposed, light may or may not pass through material 10 depending upon the polarized nature of the incident light, as was previously shown and explained in connection with FIGS. 1 and 2. However, it will also be recognized that wherever a polarized area on the top surface 10*a* is superimposed over a polarized area on the bottom surface 10*b*, no light will pass through the material irrespective of its polarization. Thus, for example, of the hatched boxes or polarized areas shown on surfaces 10*a* and 10*b* in FIG. 3, polarized areas 12'–12'''' on top surface 10*a* respectively overlie or, stated differently, are superimposed upon hatched boxes or polarized areas 13'–13'''' on the bottom surface 10*b*. Since areas 12 and 13 are cross-polarized with respect to each other, it will be obvious that no light passes through material 10 at these places irrespective of the polarized condition of the light. At still other places on material 10, namely, at those places where neither the top nor the bottom surfaces are polarized, incident light will at all times penetrate through.

Material 10 may be fabricated from a photographic film material whose opposing surfaces have been differently pre-stressed. These surfaces are then dyed with a particular dye solution, the combination of dye and stress acting to produce differently polarized surfaces, that is to say, the combination acts to cause one surface to pass light polarized only in one direction and acts to cause the other surface to pass light polarized only in another direction. The two surfaces are then respectively coated with two kinds of photo-sensitive resist material, the photo-resist material coating one surface being of the kind that is normally solvent soluble but that will become solvent insoluble when exposed to light and the photo-resist material coating the other surface being of the kind that is normally solvent insoluble but that will become solvent soluble when exposed to light. Following the desposition of the abovesaid photo-resist coatings, a transparency is placed over one of the coatings, namely, the coating that becomes solvent-soluble on exposure to light, and light thereafter projected onto it. The exposed portions of this coating are then "washed" away with the appropriate solvent, the same solvent also "bleaching out" or "dissolving out" the dye crystals beneath, thereby leaving a first polarized and non-polarized pattern that corresponds to the programmed image of the transparency.

The same film structure surface is then again exposed to light, the light passing through the film structure to the opposite surface thereof which, it will be remembered, is differently polarized. As a result, only that light that is initially incident upon the non-polarized portions of the top surface passes completely through to the second photo-resist coating and, wherever this occurs, this second coating becomes solvent insoluble. Following this, the unexposed portions of the second photo-resist coatings are then washed away, the solvent as before, also bleaching or dissolving out the crystals of dye beneath. Hence, on this opposite surface of the film structure, there is produced a second polarized and non-polarized pattern, this second pattern being accurately in registration with the first pattern as is required. It should be mentioned, however, that this is only one technique by means of which different patterns of polarization on the two surfaces may be obtained. However, variations of this technique may be required and used according to the nature of the desired pattern positioning and these are dictated by system requirements.

More particularly, considering the fabrication of material 10 in greater detail, reference is made to FIG. 4(*a*) of FIGS. 4(*a*)–4(*g*) wherein a cross-section is shown of a sheet of photographic film 14 whose opposite surface layers 14*a* and 14*b* are differently stressed, that is to say, the two sides of the film have their optical "grain" running in different directions, at 90° to each other, one 45° to the left of vertical, the other 45° to the right of vertical. Stated differently, each surface of film structure 14 is composed of molecules which are oriented substantially parallel to one another and at 45° to the edges of the sheet, the orientation axes of the molecules on he two surfaces being at right angles to one another. This pre-stressed type of film is sold by the Polaroid Corporation, Cambridge, Mass., and further information about it may be obtained from an article by Edwin H. Land entitled "Vectographs: Images in Terms of Vectorial Inequality and Their Application in Three-Dimensional Representation," published in the Journal of the Optical Society of America, volume 30, Number 6, pages 230–234, June 1940 issue.

The first step in the process is that of transforming stressed surface layers 14*a* and 14*b* to cross-polarized layers so that only light of one polarization will pass through one of the layers and only light that is cross-polarized to the first will pass through the second of the layers. For this purpose, a material is applied to layers 14*a* and 14*b* which, when absorbed by these layers, will combine with or coact with the aforementioned stresses in them to produce the desired cross-polarization effect. In general, any material may be used that will form crystalline polarizing layers when oriented by the directional stresses in the film 14 surface layers. Specifically, one such material is the compound of iodoquinine sulfate in solution, with a small percentage of wetting agents added to the solution to make the compound more soluble in water. In using such a solution, the surfaces of film structure 14 are simply dyed with the solution until they become opaque to ordinary light and the solution may be applied in any convenient manner, such as by spraying it or brushing it on. The two cross-polarized surface layers are depicted in FIG. 4(*b*) wherein they are designated 14*c* and 14*d*.

Once the polarized layers are produced as described, they are respectively coated with two layers of a photo-sensitive resist material, the layer of resist material on one surface, designated 15*a* in FIG. 4(*c*), being different than the layer of resist material, designated 15*b*, on the other surface. In other words, two different photo-sensitive resist materials are respectively deposited as layers 15*a* and 15*b* on polarized surface layers 14*c* and 14*d*. More specifically, layer 15*a* is made of a resist material which, after being applied to the film surface, is normally in a solvent insoluble state but which has the property of becoming solvent soluble wherever it is exposed to light. Resist layer 15*b*, on the other hand, is different in the sense that it is normally solvent soluble but, wherever exposed to light, it becomes solvent insoluble. Both resist layers are hard and dry after being applied.

The two kinds of resist materials mentioned above are well known and commercially available. Accordingly, detailed discussions of them are not deemed necessary here. Suffice it to say, therefore, that the photo-sensitive resist material of layer 15*a* is manufactured and sold by the Master Sales and Service Corporation of Wyncote, Pennsylvania, and is sold by this company under the name of Azoplate Positop Photo-Resist. As for the photo-sensitive resist material of layer 15*b*, one such class of materials comprises those materials known as polyvinyl alcohols. The Kodak Corporation of Rochester, New York manufactures and sells one such material, which is commercially known as Kodak Photo-Resist (KPR). Both the Kodak product as well as the Master Sales and Service product are used in the photo-etch process for making printed circuits and, therefore, as was previously mentioned, they are well known to those skilled in the art.

Following the deposition of layers 15*a* and 15*b*, a transparency 16 upon which image of some sort is formed or recorded is positioned between layer 15*a* and a light source 17, as is shown in FIG. 4(*d*). Transparency 16 may be a frame of photographic film upon which an image is recorded in the form of opaque and transparent portions or it may, as a further example, be a thin sheet of metal that is impervious to light but that has a pattern cut out of it through which light may pass. In general, transparency 16 may be any member that will selectively prevent and permit light to pass through it. In the transparency shown in FIG. 4(*d*), the opaque portions of the transparency are designated 16*a* and 16*b* while the transparent portions thereof are designated 16*c* and 16*d*.

In view of what has been said, it will be recognized that when light source 17 is turned on, the light therefrom that is incident upon opaque transparency portions 16*a* and 16*b* will be prevented from passing through to layer 15*a* below but that the light incident upon transparent portions 16*c* and 16*d* will pass therethrough to the corresponding portions of layer 15*a* beneath. It will also be recognized that this light will also pass through layer 15*a*, polarized surface layer 14*c*, and the body portion of film structure 14 to cross-polarized surface layer 14*d*. As a result, those portions of resist layer 15*a* that are directly beneath transparent portions 16*c* and 16*d* and, therefore, have been exposed to the light, are rendered solvent soluble. It should further be mentioned at this point that the light that has passed through transparent portions 16*c* and 16*d* became polarized in passing through polarized layer 14*c* which acts as a polarizer and, consequently, failed to pass through cross-polarized layer 14*d*. Accordingly, resist layer 15*b* thus far remains unaffected by this first projection of light.

Following the above-described exposure of resist layer 15*a*, film structure 14 is removed and its resist layer 15*a* thereafter washed with a solution in which the previously exposed portions of the layer are soluble. Alkaline solutions such as hydroxides of potassium, sodium or ammonia are examples of solutions that may be used in this step. With the removal of these soluble portions of layer 15*a*, those portions of polarized layer 14*c* that were therebeneath are exposed. The polarizing dye material therein, more specifically the oriented iodoquinine sulfate crystals, are then removed from those corresponding portions of layer 14*c*, either by the same solvent solution that removed the soluble portions of layer 15*a* or with the aid of another appropriate solution, such as a potassium bromide solution.

Figure 4A:
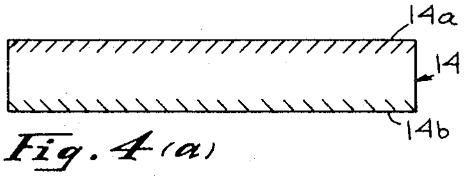
Figure 4B:
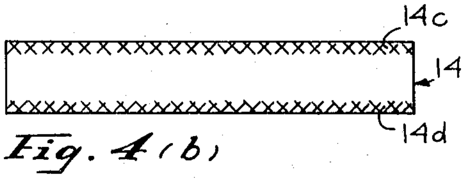
Figure 4C:
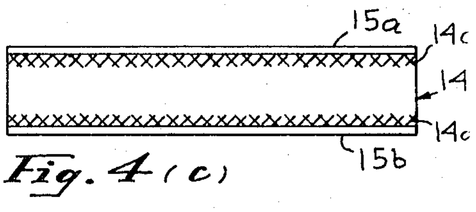
Figure 4D:
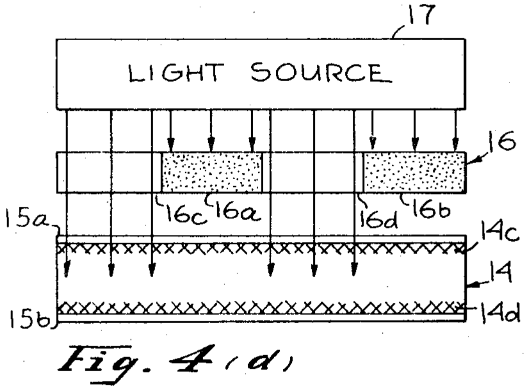
Figure 4F:
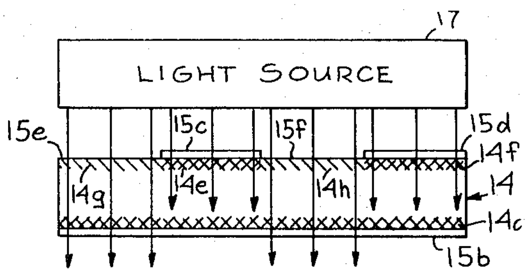
Figure 4E:
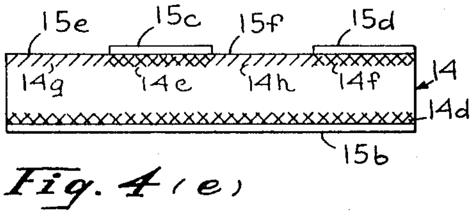

When this has been done, the product thus far obtained is as illustrated in FIG. 4*e*, to which reference is now made. As shown therein, portions 15*c* and 15*d* of resist layer 15*a* remain intact, those being those portions that were beneath opaque portions 16*a* and 16*b* of transparency 16 during the light exposure period. Similarly, portions 14*e* and 14*f* of polarized layer 14*c*, which were respectively shielded from the solvent solution by portions 15*c* and 15*d*, also remain. On the other hand, 15*e* and 15*f* represent washed away portions of resist layer 15*a*, these being those portions that were beneath transparent portions 16*c* and 16*d* of transparency 16 during the abovesaid exposure period. Similarly, 14*g* and 14*h* designate portions of layer 14*c* that were not shielded by the resist material. Accordingly, portions 14*g* and 14*h* are still stressed but no longer polarized. It will also be noted from the figure that cross-polarized layer 14*d* and resist layer 15*b* are still intact at this point.

At this stage in the process, film structure 14 is placed once again beneath light source 17 in the manner shown in FIG. 4*f*, namely, with layers 14*d* and 15*b* furthest away from the light source. When the light source is turned on, light therefrom passes through non-polarized portions 14*g* and 14*h* down through the film structure to the corresponding portions of resist layer 15*b* therebeneath. After due exposure, these corresponding portions of layer 15*b* are therefore rendered solvent insoluble. As for the remaining portions of resist layer 15*b*, these remaining portions remain solvent soluble due to the fact that cross-polarized regions are found above them so that the light cannot penetrate to these remaining portions of the resist layer. At the end of this second exposure period, film structure 14 is again removed from light source 17 for the purpose of washing away the still soluble portions of resist layer 15*b* and for the still further purpose of thereafter removing the polarizing dye material, namely, the iodoquinine sulfate crystals in the regions therebeneath. To accomplish these purposes, layer 15*b* initially and layer 14*d* thereafter, are subjected to the appropriate solvent or solvents, as before. Tri-chloroethylene, liquid or vapor, may be used to wash away the soluble portions of this second resist layer and as mentioned earlier, a solution of potassium bromide can be used to remove the iodoquinine sulfate crystals.

Figure 4G:
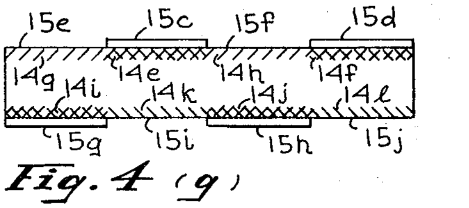

The final product obtained from the process previously delineated is shown in FIG. 4*g* wherein what was previously polarized surface layer 14*d* is reduced to polarized portions 14*i* and 14*j* as well as non-polarized portions 14*k* and 14*l*. Similarly, of resist layer 15*b*, only insoluble portions 15*g* and 15*h* remains, 15*i* and 15*j* indicating those portions that were washed away by the solvent. It is important to note from the figure that polarized portions or regions 14*e* and 14*f* on one surface are in exact registration with non-polarized portions or regions 14*e* and 14*f* on one surface are in exact registration with non-polarized portions or regions 14*k* and 14*l* on the other surface. Similarly, non-polarized portions or regions 14*g* and 14*h* on the first surface are in exact registration with polarized portions or regions 14*i* and 14*j* on the second surface. Thus, two patterns or images that are in exact registration but differently polarized are respectively recorded on the two surfaces of film structure 14.

As for three-phase equal value output light source 11, this may be an analyzer-type of device of the kind shown in FIG. 5. As shown therein, source 11 basically includes a pulsed xenon lamp 16, a lens system 17 and a filter wheel 18 mounted on a rotatable shaft 20. Filter wheel 18 is fixedly or rigidly mounted on shaft 20 and is, therefore, rotatable with it. As illustrated in the figure, filter wheel 18 is divided into three equal segments designated 18*a*, 18*b* and 18*c*, segment 18*a* being adapted to polarize light that passes through it in one direction, such as direction A heretofore mentioned, segment 18*b* is adapted to polarize light passing through it in another direction, such as direction B heretofore mentioned, and segment 18*c* is neutral, that is to say, light passing through it will not be polarized at all. Lens system 17 is mounted between pulsed xenon lamp 16 and filter wheel 18, the function of the lens system being to focus the light from the lamp onto a segment area, the light being represented by the broken line 21. It will be recognized from what has been said that the polarized condition or nature of the light passing through the filter wheel and, therefore, emanating from light source 11, will depend upon which segment area the light is incident when the xenon lamp is turned on.

A second and more sophisticated programmable element 10 that may be used in the system is illustrated in FIG. 7 and, as shown therein, comprises a sandwich arrangement of four layers as well as means by which a voltage and a spot of light may be applied to it. More particularly, the referred-to sandwich arrangement is made up of four thin transparent layers designated 22–25, the topmost and bottommost layers, namely, layers 22 and 25, being electrically conductive layers, the second layer from the top, namely, layer 23, being a photo-conductive layer, and the next-to-the-last layer, namely, layer 24, being a ferro-electric layer. With respect to the means by which a voltage is applied to the layers, the means basically includes a pair of electrodes or terminals 26*a* and 26*b* respectively connected both physically and electrically to layers 22 and 25. Also included is a direct-current voltage source connected across the terminals as well as a switch mechanism interposed between the voltage source and the terminals by means of which the polarity of the voltage applied to the terminals may be reversed. However, since the voltage source and switch mechanism themselves are so well known and, furthermore, since they are not an inherent part of the subject invention, it is not deemed necessary to show them in the figure nor is it considered necessary to describe them with any detail. Suffice it to say, therefore, that the voltage source applies a voltage of proper magnitude between terminals 26*a* and 26*b* and, therefore, across layers 22–25, and the switch selectively reverses the polarity of this voltage when it is so required to be done. As for the spot of light mentioned earlier, the FIG. 7 apparatus further includes a flying-spot scanner which, because it is also well known, is merely represented schematically in the figure by input light source 27 and lens system 28. Suffice it to say, therefore, that the flying-spot scanner scans or traverses layers 22–25 with a tiny spot of light, the spot of light moving across the surface of the layers one line at a time until the entire surface area has been covered. In operating this device, a D.C. voltage is impressed across transparent conductors 22 and 25 by means of terminals 26*a* and 26*b*. As previously mentioned, a spot of light produced by the flying-spot scanner is impinged upon the device, the light passing through the layers because of their transparency. As is well known, photo conductor 23 becomes non-resistive at the illuminated spot, with the result that the light-activated area allows current to flow through ferro-electric 24 at that point. When the current flows, the ferro-electric becomes polarized in the direction of the current flow and when the light impingement is removed, the transparent ferro-electric material retains its polarization. On the other hand, under the identical conditions but with the input D.C. voltage polarity reversed, the same polarization of the ferro-electric occurs but in the opposite direction. Finally, when the voltage is removed, the transparent ferro-electric layer retains discreet areas of polarization, the direction of which was determined by the polarity of current flow during the input cycle and which may be read-out as a pattern of polarized light by using a series or parallel scan input light beam.

An interesting and advantageous aspect or feature of the FIG. 7 device is that it can be used over and over again simply by neutralizing or erasing the pattern of polarization then on it and thereafter recording a new pattern on it in the manner previously delineated. This process of neutralization or erasure can be accomplished by again scanning the device with a point of light and, at the same time, reversing the polarity of the applied voltage at each point in the scan from what it was at the time the pattern was first formed or recorded. By so doing, the current at each point will flow in a direction opposite to that in which it flowed the first time, thereby neutralizing or erasing any polarization that may be recorded at that point. It is thus seen that the FIG. 7 device introduces a far greater degree of flexibility.

Although the materials out of which layers 22–25 are known, some are mentioned here by way of example. Thus, layers 22 and 25 may respectively be made from a stannic oxide material or else may take the form of a thin film of metal. As for layers 23 and 24, photo-conductive layer 23 may be made with cadmium sulphide or may be made from any of the selenium materials, whereas ferro-electric layer 24 may be made with barium titanate or lead zirconate, and either of these may be modified with such materials as lead niobate, other niobates, or bismuth.

Having described the underlying principles of the present invention and having also described examples of some of the basic elements to be found in any embodiment of the invention, reference is now made to FIGS. 6*a*–6*c* wherein, in accordance with the present invention, computer, data processing and information storage and retrieval systems are presented in block-diagram form. Thus, the system in FIG. 6*a* is shown to include an unpolarized light source 30, a three-position analyzer 31, a program element 32, an input element 33 and a read-out device 34. Unpolarized light source 30 may be any source of light, such as xenon lamp 16 in FIG. 5. As for three-position analyzer 31, this element may be any device that will receive the unpolarized light from source 30 and from it produce light polarized in either one direction or another or, on the other hand, that will permit the unpolarized light to pass through it unaffected in accordance with a designed sequence. The device shown in FIG. 5 is an example of a mechanism that may be utilized as a three-position analyzer. Program element 32 is the system memory whereas input element 33, as its name implies, is the element containing the data fed into the system and that cooperates with the program element and the light ouput of the analyzer to produce a responsive output pattern that is received by read-out device 34. Program element 32 as well as input element 33 may be members 10 illustrated in FIGS. 1, 2 or 3 or member 10' shown in FIG. 7, or any modification or arrangement of either. Furthermore, it will be recognized that it is immaterial whether input element 33 follows program element 32 in the system or whether their order is reversed.

A similar system is shown in FIG. 6*b* in which unpolarized light source 30, three-position analyzer 31 and readout 34 are the same as before. However, where the program and input elements in FIG. 6*a* were separate and distinct elements and, therefore, could be individually changed, they are combined in the FIG. 6*b* system as indicated by the designation 35. Thus, in FIG. 6*b*, for any one combined program and input element in the system, the output fed to the readout is determined solely by the nature of the applied light whereas, in the FIG. 6*a* system, the output would also depend upon the particular input element used.

It will be apparent that the two systems may compatibly be combined to form a single large system, such as is shown in FIG. 6*c*. However, each segment or channel of the system would include the same elements and function in the same manner as heretofore described.

Although a number of particular arrangements of the invention have been illustrated above by way of example, it is not intended that the invention be limited thereto. Accordingly, the invention should be considered to include any and all modifications, alterations or equivalent arrangements falling within the scope of the annexed claims.

Having thus described the invention, what is claimed as new is:

1. Optical apparatus by means of which binary computations are made and data processed, said apparatus comprising: a layer of material whose opposing surfaces have been processed to pass only light polarized in certain directions, the unit areas on one of said surfaces and those on the other of said surfaces being polarized in one of two directions and unpolarized in accordance with a predetermined pattern, the unit areas on one surface respectively being in registration with the unit areas on the other of said surfaces; and means for selectively projecting unpolarized light and light polarized in one of said two directions against the unit areas of said surfaces, whereby a pattern of light passes through said layer of material that corresponds to the polarized patterns on the surfaces thereof and to the pattern of the projected light.

2. Optical apparatus by means of which binary computations are made and data processed, said apparatus comprising: a first layer of material having a first surface that is polarized and unpolarized in accordance with a first predetermined pattern, the polarized portions of said first surface being polarized in one of two directions; a second layer of material having a second surface that is polarized and unpolarized in accordance with a second predetermined pattern, the polarized portions of said second surface being polarized in one of said two directions, said first and second layers being positioned in registration with each other; and means for selectively projecting unpolarized light and light polarized in one of said two directions against said layers, whereby a pattern of light passes through that corresponds to the polarized and unpolarized patterns on the surfaces of said layers and to said projected light.

3. The optical apparatus defined in claim 2 wherein said means includes a source of unpolarized light; and an analyzer element for selectively passing said unpolarized light and polarizing it in said two directions, said element also including means for maintaining the polarized and unpolarized outputs at the same intensity.

4. Optical apparatus by means of which binary computations are made and data processed, said apparatus comprising: a strip of material processed to selectively pass unpolarized light and light polarized in one of two directions, said strip of material including a sandwich arrangement of four transparent layers with the top and bottom layers being conductors, the next-to-the-top layer being a photo conductor, and the next-to-the-bottom layer being a ferroelectric, said ferroelectric layer being selectively polarized in said two directions and unpolarized in accordance with a predetermined pattern; and means for selectively projecting unpolarized light and light polarized in one of said two directions against said strip of material, whereby a pattern of light passes through said material that corresponds to the polarized patterns on the ferroelectric layer thereof and to the pattern of the projected light.

5. Optical apparatus by means of which binary computations are made and data processed, said apparatus comprising: a frame of film having a first surface layer formed into a first polarized and non-polarized pattern and a second surface layer formed into a second polarized and non-polarized pattern, the polarized areas of said second surface layer being cross-polarized with respect to the polarized areas of said first surface layer and in registration with the unpolarized thereon; a source of unpolarized light; and a layer of material that is selectively polarized and unpolarized according to a predetermined pattern, the polarized areas of said layer of material being selectively polarized according to the polarizations of the first and second surface layers of said frame of film, said layer of material being interposed between said frame of film and said light source and in registration therewith, whereby a binary pattern of output light is passed through said frame of film.

6. The optical apparatus defined in claim 5 wherein said layer of material is another frame of film having at least one surface layer thereof formed into said polarized and unpolarized pattern.

7. The optical apparatus defined in claim 5 wherein said layer of material includes a sandwich arrangement of a photoconductive layer and a ferroelectric layer, said ferroelectric layer being polarized and non-polarized according to said predetermined pattern.

References Cited

UNITED STATES PATENTS

| | | | |
|---|---|---|---|
| 2,165,974 | 7/1939 | Land | 350—153 |
| 2,909,973 | 10/1959 | Koelsch | 95—4.5 |
| 3,155,944 | 11/1964 | Oberg | 340—173 |
| 3,229,261 | 1/1966 | Fatuzzo | 340—173 |
| 3,305,669 | 2/1967 | Fan | 88—10 |

TERRELL W. FEARS, *Primary Examiner.*